US012766955B2

(12) United States Patent
Kudo

(10) Patent No.: US 12,766,955 B2
(45) Date of Patent: Oct. 20, 2026

(54) VEHICLE DRIVE ASSIST APPARATUS

(71) Applicant: SUBARU CORPORATION, Tokyo (JP)

(72) Inventor: Shinya Kudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 147 days.

(21) Appl. No.: 18/830,659

(22) Filed: Sep. 11, 2024

(65) Prior Publication Data

US 2025/0108687 A1 Apr. 3, 2025

(30) Foreign Application Priority Data

Sep. 29, 2023 (JP) ................................ 2023-169599

(51) Int. Cl.
*B60K 31/00* (2006.01)

(52) U.S. Cl.
CPC .......... *B60K 31/00* (2013.01); *B60K 2310/20* (2013.01); *B60W 2552/00* (2020.02); *B60W 2555/60* (2020.02); *B60W 2720/106* (2013.01); *B60Y 2300/143* (2013.01)

(58) Field of Classification Search
CPC ............... B60K 31/00; B60K 2310/20; B60W 2552/00; B60W 2555/60; B60W 2720/106; B60W 30/143; B60W 2520/10; B60Y 2300/143
See application file for complete search history.

(56) References Cited

U.S. PATENT DOCUMENTS

2003/0195691 A1* 10/2003 Konishi ................. B60K 31/04 123/352
2011/0160978 A1* 6/2011 Yuzawa .............. B60W 30/146 701/93

(Continued)

FOREIGN PATENT DOCUMENTS

CN 113044030 A * 6/2021 .......... B60W 30/143
CN 114312342 A * 4/2022
JP 2004-114988 A 4/2004

OTHER PUBLICATIONS

Machine Translation of CN-113044030-A (Year: 2021).*
Machine Translation of CN-114312342-A (Year: 2022).*

*Primary Examiner* — Sahar Motazedi
(74) *Attorney, Agent, or Firm* — TROUTMAN PEPPER LOCKE LLP

(57) ABSTRACT

A vehicle drive assist apparatus includes: an external environment recognizer; a vehicle-speed adjustment switch that adjusts a set vehicle speed for constant-speed travel control; and a vehicle speed controller that increases or decreases the set vehicle speed by a unit vehicle speed every time the switch is tapped, calculates a target acceleration rate based on a basic acceleration characteristic, and adjusts a vehicle speed to the set vehicle speed by using the target acceleration rate. When the set vehicle speed is so as to increase in response to the tapping and the set vehicle speed is above or equal to a speed limit, the controller calculates a first target acceleration rate until the vehicle speed reaches the speed limit based on a high acceleration characteristic, and calculates a second target acceleration rate after the vehicle speed reaches the speed limit based on the basic acceleration characteristic.

12 Claims, 10 Drawing Sheets

(56) References Cited

U.S. PATENT DOCUMENTS

| | | | | |
|---|---|---|---|---|
| 2012/0078484 | A1* | 3/2012 | Kato | B60W 30/18163<br>701/96 |
| 2018/0079411 | A1* | 3/2018 | Inoguchi | B60W 30/143 |
| 2020/0122723 | A1* | 4/2020 | Kanno | B60W 30/182 |
| 2021/0031764 | A1* | 2/2021 | Roques | B60L 15/20 |
| 2025/0100554 | A1* | 3/2025 | Choi | B60W 50/0097 |

* cited by examiner

VEHICLE DRIVE ASSIST APPARATUS

CROSS-REFERENCE TO RELATED APPLICATION

The present application claims priority from Japanese Patent Application No. 2023-169599 filed on Sep. 29, 2023, the entire contents of which are hereby incorporated by reference.

BACKGROUND

The disclosure relates to vehicle drive assist apparatuses equipped with active cruise control functions.

In recent years, a known drive assist apparatus in a vehicle, such as an automobile, recognizes a vehicle-exterior environment in front of the vehicle by using, for example, a millimeter wave radar, a stereo camera, and a monocular camera, and performs vehicle travel control based on the recognized vehicle-exterior environment. One of widely known functions of such travel control is a function for performing tracking travel control with respect to a detected leading vehicle when the leading vehicle is detected (captured) in front of the vehicle. Normally, such tracking travel control is widely put to practical use as active cruise control (ACC). When the ACC is being executed, the tracking travel control is performed in a state where a leading vehicle is detected in front of the vehicle. When a leading vehicle is not detected, constant-speed travel control is performed at a set vehicle speed set by a driver who drives the vehicle.

The set vehicle speed can be adjusted (reset) to a vehicle speed desired by the driver even during the constant-speed travel control.

When an adjustment operation is performed for increasing the set vehicle speed, the vehicle accelerates to the newly-adjusted set vehicle speed in accordance with the constant-speed travel control.

If the newly-adjusted set vehicle speed deviates largely so as to become faster than the current vehicle speed, acceleration responsiveness is desired for quickly bringing the vehicle speed closer toward the set vehicle speed.

There have been proposed various techniques in the related art with regard to a vehicle drive assist apparatus for quickly bringing the vehicle speed closer toward the desired vehicle speed when the vehicle speed desired by the driver largely deviates from the set vehicle speed during the ACC. For example, Japanese Unexamined Patent Application Publication (JP-A) No. 2004-114988 discloses a technique in which, when the set vehicle speed is to be increased or decreased in response to a continuous operation performed on a vehicle-speed setting device, the amount of change in the set vehicle speed increases as the continuous operation time period becomes longer, and the set vehicle speed is maintained for a fixed time period when the set vehicle speed reaches a predetermined delimiter vehicle-speed value.

SUMMARY

An aspect of the disclosure provides a vehicle drive assist apparatus including an external environment recognizer, a vehicle-speed adjustment switch, and a vehicle speed controller. The external environment recognizer is configured to recognize external environment information of a vehicle. The external environment information includes information on a vehicle travel lane of the vehicle. The vehicle-speed adjustment switch is configured to perform an adjustment for increasing or decreasing a set vehicle speed for performing constant-speed travel control. The vehicle speed controller is configured to increase or decrease the set vehicle speed by a unit vehicle speed every time a tapping operation is performed on the vehicle-speed adjustment switch, calculate a target acceleration rate based on a preset basic acceleration characteristic, and adjust a vehicle speed to the set vehicle speed by using the calculated target acceleration rate. The vehicle speed controller is configured to, when the set vehicle speed is adjusted so as to increase in response to the tapping operation performed consecutively on the vehicle-speed adjustment switch and the set vehicle speed is above or equal to a speed limit, calculate a first target acceleration rate until the vehicle speed reaches the speed limit based on a high acceleration characteristic for generating an acceleration rate higher than the basic acceleration characteristic, and calculate a second target acceleration rate after the vehicle speed reaches the speed limit based on the basic acceleration characteristic.

An aspect of the disclosure provides a vehicle drive assist apparatus including an external-environment recognition module, a set-vehicle-speed adjustment switch, and a processor. The external-environment recognition module is configured to recognize external environment information of a vehicle. The external environment information includes information on a vehicle travel lane of the vehicle. The set-vehicle-speed adjustment switch is configured to perform an adjustment for increasing or decreasing a set vehicle speed for performing constant-speed travel control in response to a tapping operation. The processor is configured to increase or decrease the set vehicle speed by a unit vehicle speed every time the tapping operation is performed, calculate a target acceleration rate based on a preset basic acceleration characteristic, and adjust a vehicle speed to the set vehicle speed by using the calculated target acceleration rate. The processor is configured to, when the set vehicle speed is adjusted so as to increase in response to the tapping operation performed consecutively on the set-vehicle-speed adjustment switch and the set vehicle speed is above or equal to a speed limit, calculate a first target acceleration rate until the vehicle speed reaches the speed limit based on a high acceleration characteristic for generating an acceleration rate higher than the basic acceleration characteristic, and calculate a second target acceleration rate after the vehicle speed reaches the speed limit based on the basic acceleration characteristic.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technique disclosed in JP-A No. 2004-114988, for example, if the vehicle speed desired by the driver deviates largely so as to become faster than the set vehicle speed and if the vehicle speed desired by the driver exceeds the speed limit, it may be not possible to achieve acceleration intended by the driver while ensuring safety.

It is desirable to provide a vehicle drive assist apparatus that can smoothly change a set vehicle speed for quickly accelerating the vehicle to a speed limit while respecting the driver's intention and ensuring safety.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The configuration of a vehicle drive assist apparatus 2 equipped with an active cruise control (referred to as "ACC" hereinafter) function will be described as an example of a vehicle drive assist apparatus equipped in a vehicle 1, such as an automobile.

Figure 1:
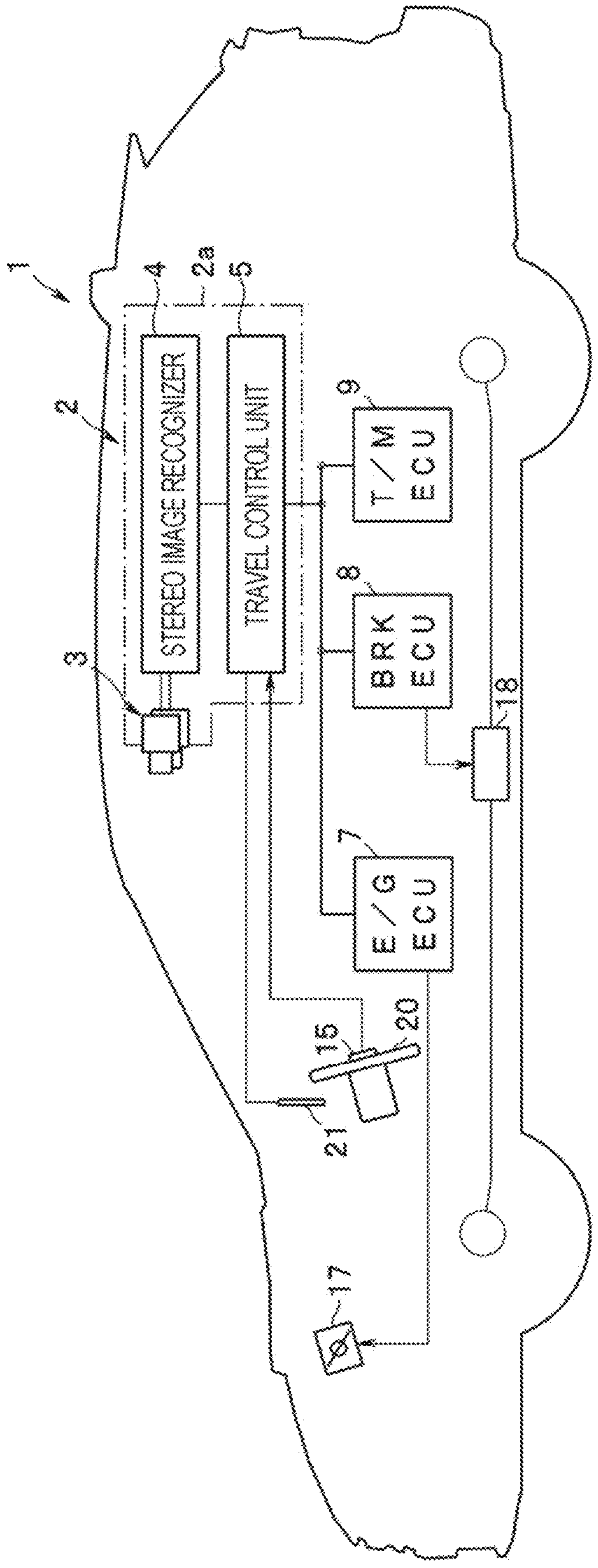
FIG. 1 schematically illustrates the configuration of a drive assist apparatus equipped in a vehicle.

As illustrated in FIG. 1, the drive assist apparatus 2 mainly includes a stereo camera assembly **2*a* integrally equipped with, for example, a stereo camera 3, a stereo image recognizer 4, and a travel control unit 5. The travel control unit 5 of the stereo camera assembly 2*a* is coupled to various control units, such as an engine control unit (E/G_ECU) 7, a brake control unit (BRK_ECU) 8, and a transmission control unit (T/M_ECU) 9**, in a communicable manner.

The stereo camera 3 includes a pair of left and right charge-coupled device (CCD) cameras equipped with solid-state image sensors, such as CCDs, as stereo optical systems. The CCD cameras included in the stereo camera 3 are attached to the front side of the ceiling of the vehicle cabin with a fixed distance therebetween. The CCD cameras capture a stereo image of a target outside the vehicle from different viewpoints and output captured image information to the stereo image recognizer 4.

The stereo image recognizer 4 receives the image information from the stereo camera 3 and also receives, for example, a vehicle speed V from the T/M_ECU 9. The stereo image recognizer 4 recognizes forward information, such as three-dimensional-object data in front of the vehicle 1 and boundary-line data defining a road, based on the image information from the stereo camera 3, and estimates a vehicle travel lane 22 based on the recognized information. Furthermore, the stereo image recognizer 4 performs leading-vehicle detection on the vehicle travel lane 22 based on the recognized three-dimensional-object data.

In one example, the stereo image recognizer 4 generates distance information based on the triangulation principle from a deviation amount of a corresponding position relative to a pair of left and right images (i.e., a pair of stereo images) captured in the vehicle traveling direction by the stereo camera 3.

In detail, the stereo image recognizer 4 divides a reference image (e.g., right image) into, for example, 4×4 pixel sub-regions. Then, the stereo image recognizer 4 compares the brightness or the color pattern of each sub-region with a comparison image. As a result of this comparison, the stereo image recognizer 4 finds a corresponding region and determines a distance distribution over the entire reference image.

Furthermore, the stereo image recognizer 4 checks a brightness difference between adjacent pixels (e.g., pixels adjacent to each other at the right side and the lower side) among the pixels in the reference image. The stereo image recognizer 4 extracts pixels with a brightness difference exceeding a threshold value as edges, and applies the distance information to the extracted pixels (edges), thereby generating a distribution image (distance image) of edges provided with the distance information.

Then, the stereo image recognizer 4 performs, for example, a known grouping process on the distance image and performs pattern matching with various preset templates, thereby recognizing, for example, a lane line, a sidewall, and a three-dimensional object in front of the vehicle 1. The stereo image recognizer 4 allocates different IDs to these pieces of recognized data, and continues to monitor these pieces of recognized data between frames for each ID. Moreover, the stereo image recognizer 4 estimates the vehicle travel lane 22 based on, for example, lane-line data and sidewall data and extracts (detects), as a leading vehicle, a three-dimensional object that is present on the vehicle travel lane 22 and that is moving at a predetermined speed (e.g., 0 km/h or higher) in substantially the same direction as the vehicle 1.

The stereo image recognizer 4 having detected the leading vehicle in this manner calculates, as leading-vehicle information, for example, a leading-vehicle distance D (=vehicle-to-vehicle distance D), a leading-vehicle speed Vf (=(rate of change in vehicle-to-vehicle distance D)+(vehicle speed V)), and a leading-vehicle acceleration rate af (=differential of leading-vehicle speed Vf). If there is a leading vehicle traveling at a leading-vehicle speed Vf below or equal to a predetermined value (e.g., 4 km/h or lower) and not accelerating, the leading vehicle is recognized as being in a substantially stopped state.

Figure 2:
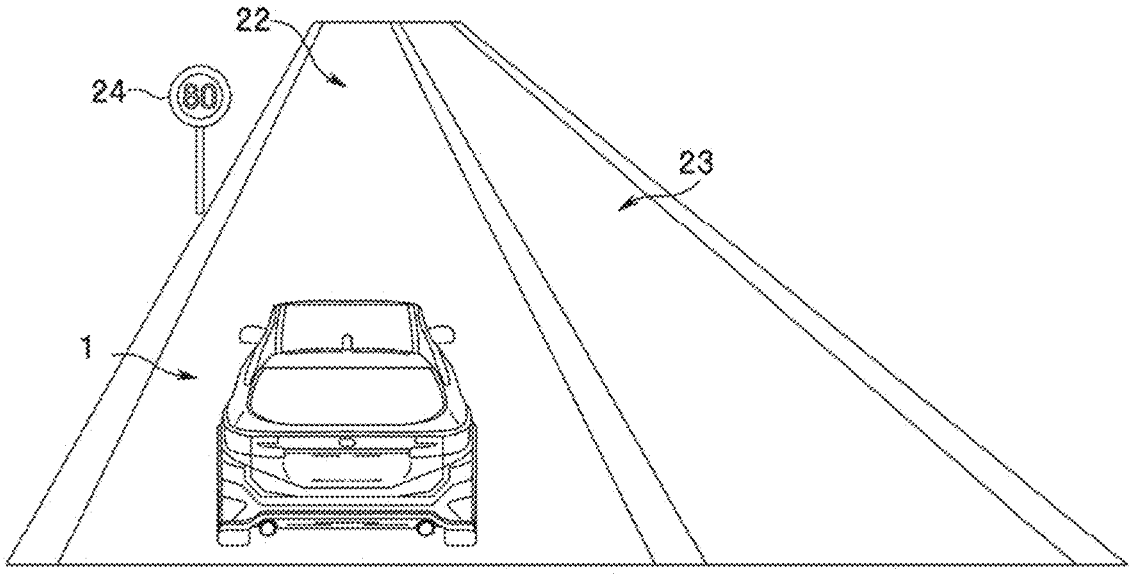
FIG. 2 illustrates an example where an external environment is recognized by a stereo image recognizer.

In the processing of such image information, for example, the stereo image recognizer 4 also recognizes a speed limit Vr displayed on a road sign 24, as illustrated in FIG. 2. In one example, the stereo image recognizer 4 stores template data related to various signs, such as the road sign 24 and a road-surface sign, and recognizes the sign 24 in accordance with pattern matching with the templates. Then, for example, if the recognized sign 24 is a speed sign, the stereo image recognizer 4 recognizes the speed limit Vr displayed on the sign 24.

Furthermore, in the processing of such image information, the stereo image recognizer 4 also recognizes at least one adjacent travel lane 23 disposed adjacent to the vehicle travel lane 22 and extending in the same direction. The recognition of, for example, the vehicle travel lane 22, the adjacent travel lane 23, and the speed limit may be appropriately combined with map information output from, for example, a navigation device.

Accordingly, in this embodiment, the stereo camera 3 and the stereo image recognizer 4 correspond to a specific example of an external environment recognizer (external-environment recognition module).

The travel control unit 5 receives, for example, various kinds of vehicle-front-related recognition information from the stereo image recognizer 4, as well as the vehicle speed V from the T/M_ECU 9.

Moreover, the travel control unit 5 receives, for example, various input signals input by the driver by using a cruise control switch 15. In this embodiment, the cruise control switch 15 includes, for example, multiple operation switches including push switches and toggle switches disposed at a steering wheel 20.

Figure 3:
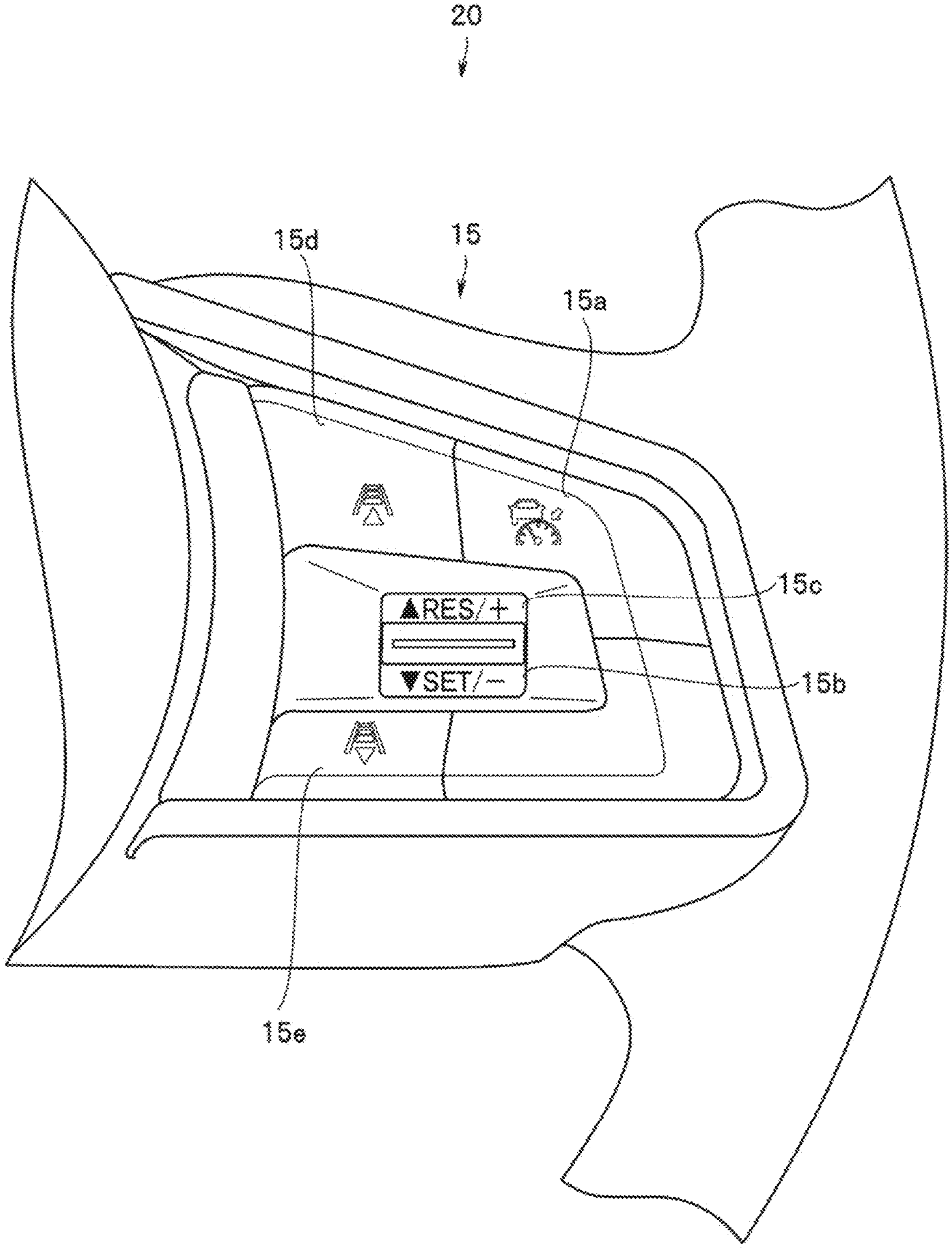
FIG. 3 is a plan view illustrating an example of a cruise control switch.

In detail, as illustrated in FIG. 3, the cruise control switch 15 has a cruise switch 15*a*, a set switch (SET) 15*b*, a resume switch (RES) 15*c*, and vehicle-to-vehicle-distance setting switches 15*d* and 15*e*.

The cruise switch 15*a* is a main switch for turning the ACC on and off and is used for switching the ACC between on and off modes.

The set switch (SET) 15*b* serves as a vehicle speed setter and is used for, for example, setting the speed of the traveling vehicle 1 as a set vehicle speed Vs in a state where the ACC is executed. The set switch 15*b* also serves as a vehicle speed adjuster and as a set-vehicle-speed adjustment switch for adjusting the set vehicle speed Vs toward a lower speed. For example, every time the set switch 15*b* is tapped by the driver, the set switch 15*b* serves as a down switch (−) that changes the set vehicle speed Vs toward a lower speed by a predetermined unit vehicle speed K1 (e.g., 5 km/h).

The resume switch (RES) 15*c* serves as a vehicle speed setter and is used for, for example, resetting the previously-stored set vehicle speed Vs. The resume switch 15*c* also serves as a vehicle speed adjuster and as a set-vehicle-speed adjustment switch for adjusting the set vehicle speed Vs toward a higher speed. For example, every time the resume switch 15*c* is tapped by the driver, the resume switch 15*c* serves as an up switch (+) that changes the set vehicle speed Vs toward a higher speed by the predetermined unit vehicle speed K1 (e.g., 5 km/h).

The vehicle-to-vehicle-distance setting switches 15*d* (upward triangle) and 15*e* (downward triangle) are used for setting the vehicle-to-vehicle distance D between the leading vehicle and the vehicle 1.

Figure 4:
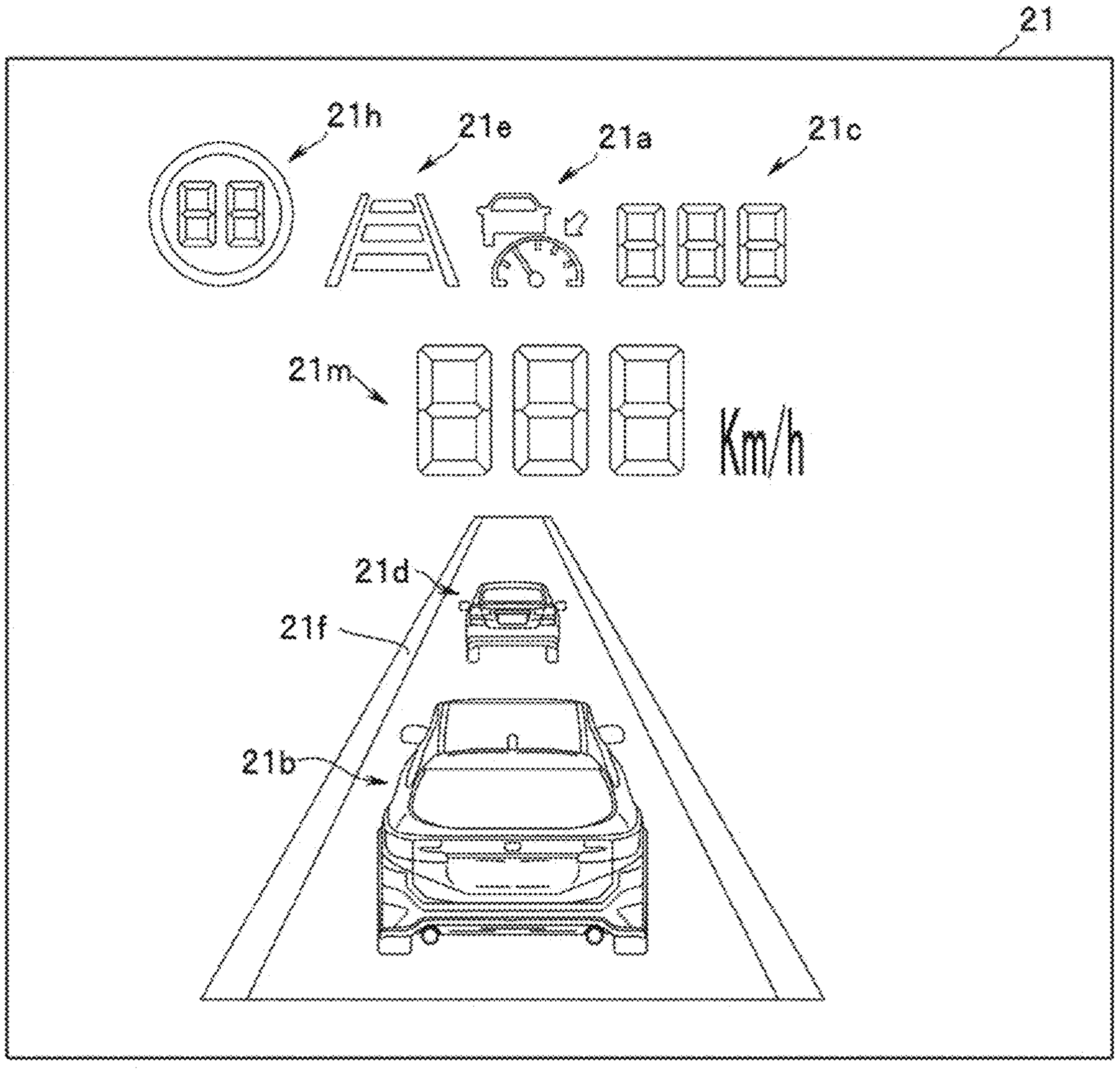
FIG. 4 illustrates indicator lamps of a cruise-control display device.

As illustrated in FIG. 1 and FIG. 4, the travel control unit 5 having such a configuration is coupled to a cruise-control display device 21 for displaying, for example, ACC-related setting information and control information.

The cruise-control display device 21 has, for example, a cruise-switch indicator lamp 21*a*, a vehicle indicator lamp 21*b*, a set-vehicle-speed indicator lamp 21*c*, a leading-vehicle indicator lamp 21*d*, a vehicle-to-vehicle-distance mode indicator lamp 21*e*, a lane-line indicator lamp 21*f*, a speed-limit indicator lamp 21*h*, and a speed indicator lamp 21*m*.

The cruise-switch indicator lamp 21*a* and the vehicle indicator lamp 21*b* are to be lit when the cruise switch 15*a* is turned on.

The set-vehicle-speed indicator lamp 21*c* is for displaying the set vehicle speed Vs. The set-vehicle-speed indicator lamp 21*c* is appropriately changed in display based on a vehicle-speed adjustment operation performed by the driver.

The leading-vehicle indicator lamp 21*d* and the vehicle-to-vehicle-distance mode indicator lamp 21*e* are to be lit when the stereo image recognizer 4 captures a leading vehicle.

The lane-line indicator lamp 21*f* is to be lit when the boundary lines of the vehicle travel lane 22 are recognized.

The speed-limit indicator lamp 21*h* is to be lit when the speed limit Vr is recognized.

The speed indicator lamp 21*m* is to be displayed in conjunction with a speedometer that displays the speed of the vehicle 1.

The cruise-control display device 21 having such a configuration is disposed on, for example, a combination meter.

For example, when the driver turns on the cruise switch 15*a* and operates the set switch 15*b*, the travel control unit 5 sets the vehicle speed V at the time of the operation as the set vehicle speed Vs. Alternatively, when the driver operates the resume switch 15*c*, the travel control unit 5 sets the previous set vehicle speed Vs as a new set vehicle speed Vs.

When the driver operates the vehicle-to-vehicle-distance setting switch 15*d* or 15*e*, the travel control unit 5 sets a vehicle-to-vehicle-distance mode (e.g., "long", "intermediate", or "short") for setting a tracking target distance, to be described later.

When the set vehicle speed Vs is set in this manner, the travel control unit 5 executes the ACC.

The following description relates to normal vehicle speed control performed by the travel control unit 5 for converging the vehicle speed V to the set vehicle speed Vs.

When the travel control unit 5 executes the ACC, if a leading vehicle is not detected by the stereo image recognizer 4, the travel control unit 5 performs constant-speed travel control for converging the vehicle speed V to the set vehicle speed Vs. If a leading vehicle is recognized by the stereo image recognizer 4 during the constant-speed travel control, the travel control unit 5 performs tracking travel control (including tracking stop and tracking start) for converging the vehicle-to-vehicle distance D with the leading vehicle to a tracking target distance.

When the constant-speed travel control is started, the travel control unit 5 calculates a target acceleration rate aset for converging the vehicle speed V to the set vehicle speed Vs.

In detail, for example, the travel control unit 5 calculates a vehicle-speed difference Vsdif (=Vs−V) between the vehicle speed V and the set vehicle speed Vs. Then, based on a preset basic acceleration characteristic A, the travel control unit 5 calculates the target acceleration rate aset according to the vehicle-speed difference Vsdif. For example, the basic acceleration characteristic A is a characteristic for realizing pleasant acceleration-deceleration feedback while suppressing sudden acceleration and sudden deceleration of the vehicle 1. Therefore, the basic acceleration characteristic A is set such that the target acceleration rate aset is calculated within a predetermined acceleration-deceleration range (e.g., within a range of 0.2 G as an upper limit value and −0.2 G as a lower limit value). For example, the basic acceleration characteristic A is preliminarily stored as a map in the travel control unit 5.

For example, if the vehicle-speed difference Vsdif calculated in this manner is a positive value, the target acceleration rate aset calculated increases with increasing vehicle-speed difference Vsdif within a range of an upper limit value settable for the set vehicle speed Vs or an upper limit value for the vehicle speed V at which the constant-speed travel control can be activated. In contrast, for example, if the vehicle-speed difference Vsdif is a negative value, the target acceleration rate aset calculated decreases with decreasing vehicle-speed difference Vsdif within a range of a lower limit value settable for the set vehicle speed Vs or a lower limit value for the vehicle speed V at which the constant-speed travel control can be activated (i.e., a value that increases deceleration is calculated as the vehicle-speed difference Vsdif becomes a more negative value).

When the constant-speed travel control transitions to the tracking travel control, the travel control unit 5 calculates a target acceleration rate acar for converging the vehicle-to-vehicle distance D to the tracking target distance. Although a detailed description will be omitted, for example, the travel control unit 5 sets the tracking target distance corresponding to a vehicle-to-vehicle distance mode and calculates the target acceleration rate acar based on a relative speed between the leading-vehicle speed Vf and the vehicle speed V.

Then, the travel control unit 5 sets the target acceleration rate aset or the target acceleration rate acar as an ultimate target acceleration rate a in accordance with the constant-speed travel control or the tracking travel control.

After setting the target acceleration rate a, the travel control unit 5 controls the opening of an electronically-controlled throttle valve 17 (i.e., performs engine output control) via the E/G_ECU 7, so as to generate an acceleration-deceleration rate according to the target acceleration rate a. Furthermore, if the travel control unit 5 determines that a sufficient deceleration rate cannot be obtained with the engine output control alone during deceleration, the travel control unit 5 controls the hydraulic pressure output from a brake booster 18 (i.e., performs automatic-braking intervention control) via the BRK_ECU 8.

The set vehicle speed Vs is appropriately changeable during the ACC. For example, every time the resume switch 15*c* or the set switch 15*b* is tapped during the ACC, the travel control unit 5 basically adds or subtracts the unit vehicle speed K1 (e.g., 5 km/h) to or from the set vehicle speed Vs.

When the switch 15*c* or 15*b* is tapped consecutively at a time interval shorter than a preliminarily set interval S (e.g., 500 ms), the travel control unit 5 changes the unit vehicle speed K1 to be added to or subtracted from the set vehicle speed Vs to a unit vehicle speed K2.

The unit vehicle speed K2 is set to a value greater than the unit vehicle speed K1. For example, the unit vehicle speed K2 is set to 10 km/h. In one example, when the switch 15*c* or 15*b* is tapped consecutively, the travel control unit 5 adds or subtracts the unit vehicle speed K2 (e.g., 10 km/h) to or from the set vehicle speed Vs. Then, in response to this operation, the travel control unit 5 resets the adjusted vehicle speed as a new set vehicle speed Vs.

The concept of the consecutive tapping operation includes, for example, continuous pressing (long pressing) of the switch 15*c* or 15*b* for a set period or longer without releasing the switch 15*c* or 15*b*.

Furthermore, when the resume switch 15*c* is tapped consecutively and a preset condition is satisfied during the constant-speed travel control, the travel control unit 5 temporarily transitions to a high acceleration mode.

In the transition to the high acceleration mode, when the set vehicle speed Vs is adjusted and increased to a vehicle speed above or equal to the speed limit Vr in response to consecutive tapping, the travel control unit 5 calculates a target acceleration rate hset for the high acceleration mode. The target acceleration rate hset is set to be relatively higher than the target acceleration rate aset calculated based on the basic acceleration characteristic A.

Figure 6:
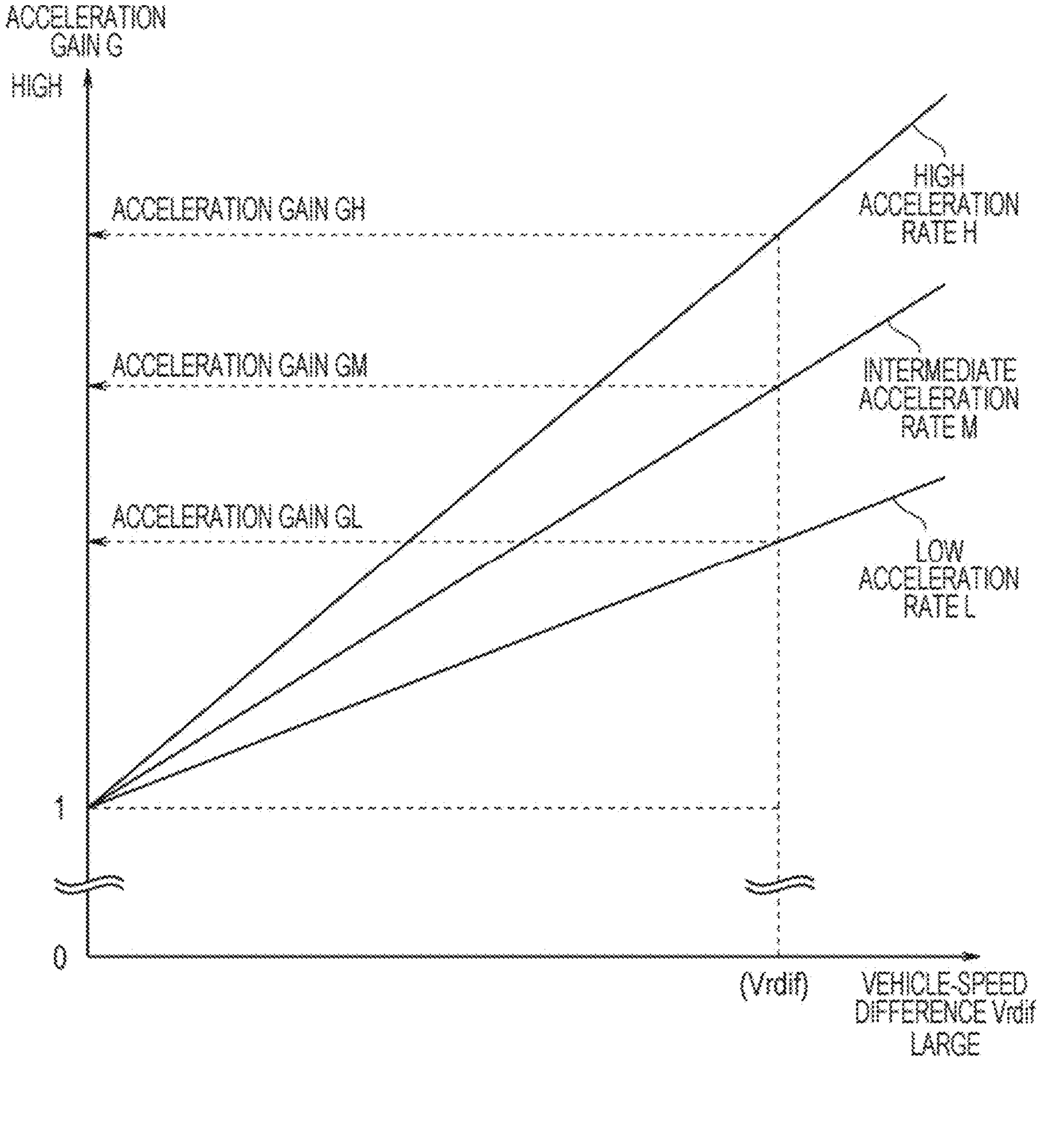
FIG. 6 illustrates an acceleration gain map based on a vehicle-speed difference for calculating a first target acceleration rate.

The target acceleration rate hset is calculated based on a high acceleration characteristic B for generating an acceleration rate higher than the basic acceleration characteristic A. In this embodiment, for example, the high acceleration characteristic B includes the basic acceleration characteristic A and a preset acceleration gain map. As illustrated in FIG. 6, the acceleration gain map is used for calculating a value larger than "1" as an acceleration gain G.

Therefore, the travel control unit 5 calculates the target acceleration rate aset based on the vehicle-speed difference Vsdif by using the basic acceleration characteristic A. The travel control unit 5 calculates a vehicle-speed difference Vrdif (=Vr−V) between the speed limit Vr and the vehicle speed V. Moreover, for example, the travel control unit 5 calculates the acceleration gain G based on the vehicle-speed difference Vrdif by using the acceleration gain map. Then, the travel control unit 5 multiplies the target acceleration rate aset by the acceleration gain G, thereby calculating the target acceleration rate hset until the vehicle speed V reaches the speed limit Vr. Accordingly, the target acceleration rate hset corresponds to a specific example of a first target acceleration rate.

Figure 5:
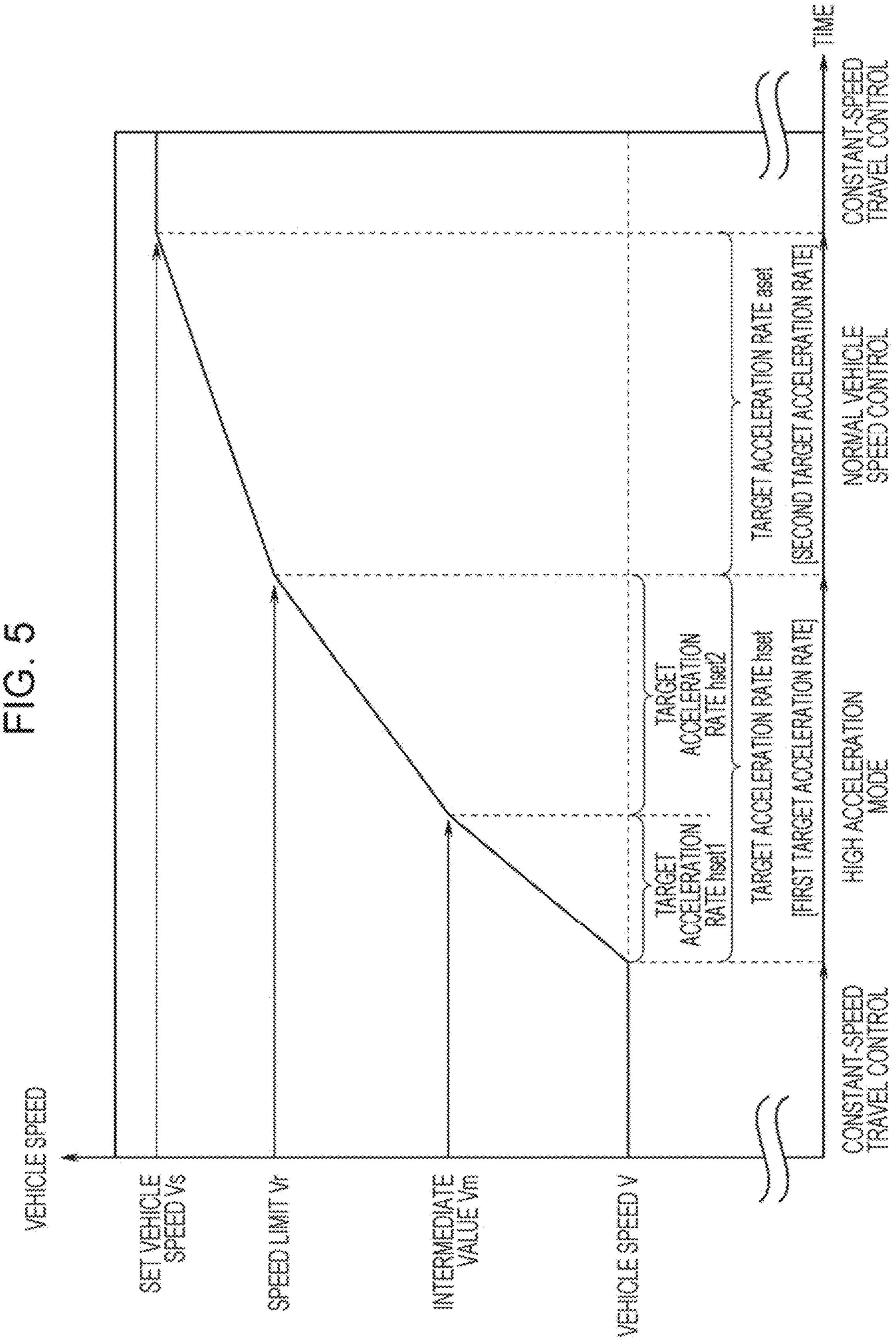
FIG. 5 illustrates an example of a relationship among a vehicle speed, a speed limit, and a set vehicle speed when a target acceleration rate is to be set.

As illustrated in FIG. 5, in the high acceleration mode using the target acceleration rate hset, the target acceleration rate hset may change in a stepwise fashion as the vehicle speed increases. For example, in the high acceleration mode, the target acceleration rate hset may change in two steps.

Therefore, in this embodiment, the target acceleration rate hset set by the travel control unit 5 includes, for example, a target acceleration rate hset1 and a target acceleration rate hset2.

In this case, the target acceleration rate hset1 in the initial phase of acceleration may change in accordance with whether the adjacent travel lane 23 exists adjacent to the vehicle travel lane 22. Therefore, for example, as illustrated in FIG. 6, the acceleration gain map enables calculation of acceleration gains GH, GM, and GL with different characteristics. When the vehicle-speed difference Vrdif is the same, the acceleration gain GH is greater than the acceleration gain GM and the acceleration gain GL. When the vehicle-speed difference Vrdif is the same, the acceleration gain GM is greater than the acceleration gain GL.

For example, when an intermediate value between the vehicle speed V and the speed limit Vr at the start of the high acceleration mode is defined as Vm (=(Vr+V)/2), the acceleration gains GH and GM are used until the vehicle speed V reaches the intermediate value Vm. Of these acceleration gains GH and GM, the acceleration gain GH is used when the adjacent travel lane 23 is recognized. The acceleration gain GM is used when the adjacent travel lane 23 is not recognized.

The acceleration gain GL is used, for example, until the vehicle speed V reaches the speed limit Vr beyond the intermediate value Vm.

In this embodiment, when the adjacent travel lane 23 is recognized, for example, a target acceleration rate hsetH calculated using the acceleration gain GH is set as the target acceleration rate hset1. When the adjacent travel lane 23 is not recognized, for example, a target acceleration rate hsetM calculated using the acceleration gain GM is set as the target acceleration rate hset1. Moreover, for example, a target acceleration rate hsetL calculated using the acceleration gain GL is set as the target acceleration rate hset2.

The high acceleration mode is cancelled when the vehicle speed V reaches the speed limit Vr. When the high acceleration mode is cancelled, the travel control unit 5 returns to the normal vehicle speed control using the target acceleration rate aset. Accordingly, the target acceleration rate aset corresponds to a specific example of a second target acceleration rate.

In this embodiment, the travel control unit 5 corresponds to a specific example of a constant-speed travel controller and a tracking travel controller of ACC, a vehicle speed controller, first and second target acceleration rate calculators, and first and second target acceleration rate setters.

Next, acceleration control in the high acceleration mode executed by the travel control unit 5 will be described with reference to flowcharts of a target-acceleration-rate setting routine illustrated in FIG. 7, FIG. 8, FIG. 9, and FIG. 10. This routine is executed repeatedly for every set time period.

Figure 7:
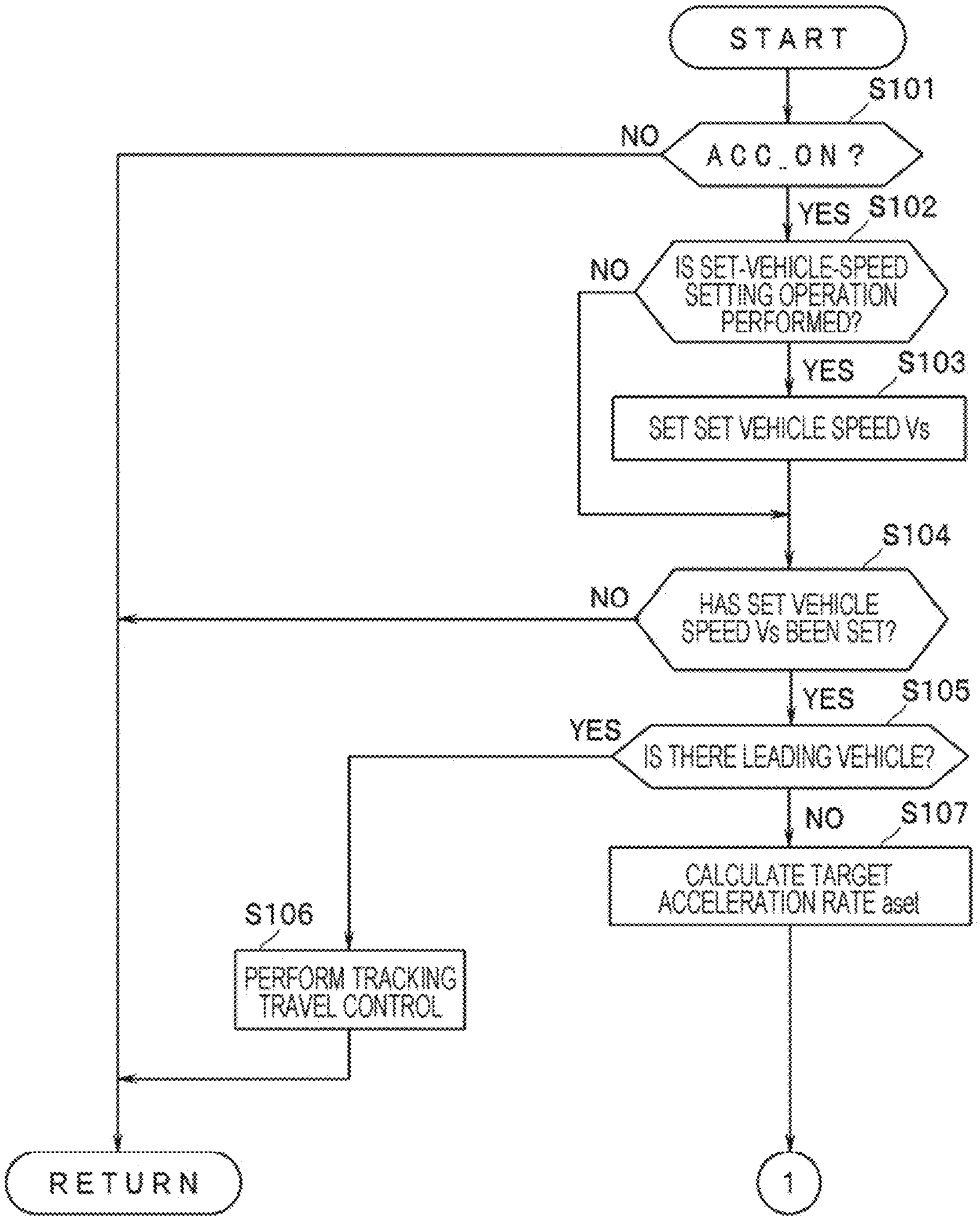
FIG. 7 is a first flowchart illustrating a target-acceleration-rate setting routine.

As illustrated in FIG. 7, when the routine starts, the travel control unit 5 first determines whether the ACC is activated (i.e., turned on) in step S101.

If the travel control unit 5 determines that the ACC is not activated in step S101 (NO in step S101), the travel control unit 5 exits the routine.

In contrast, if the travel control unit 5 determines that the ACC is activated in step S101 (YES in step S101), the travel control unit 5 proceeds to step S102.

In step S102, the travel control unit 5 determines whether a set-vehicle-speed setting operation is performed.

If the travel control unit 5 determines that the set-vehicle-speed setting operation is not performed in step S102 (NO in step S102), the travel control unit 5 proceeds to step S104 to be described later.

In contrast, if the travel control unit 5 determines that the set-vehicle-speed setting operation is performed in step S102 (YES in step S102), the travel control unit 5 proceeds to step S103.

In step S103, the travel control unit 5 sets the set vehicle speed Vs and proceeds to step S104.

When the travel control unit 5 proceeds from step S102 or step S103 to step S104, the travel control unit 5 determines whether the set vehicle speed Vs has been set.

If the travel control unit 5 determines that the set vehicle speed Vs is not set in step S104 (NO in step S104), the travel control unit 5 exits the routine.

In contrast, if the travel control unit 5 determines that the set vehicle speed Vs has been set in step S104 (YES in step S104), the travel control unit 5 proceeds to step S105.

In step S105, the travel control unit 5 determines whether there is a leading vehicle.

If the travel control unit 5 determines that there is a leading vehicle in step S105 (YES in step S105), the travel control unit 5 proceeds to step S106.

In step S106, the travel control unit 5 performs tracking travel control and subsequently exits the routine.

In contrast, if the travel control unit 5 determines that there is no leading vehicle in step S105 (NO in step S105), the travel control unit 5 proceeds to step S107.

In step S107, the travel control unit 5 calculates the target acceleration rate aset based on the basic acceleration characteristic A.

Figure 8:
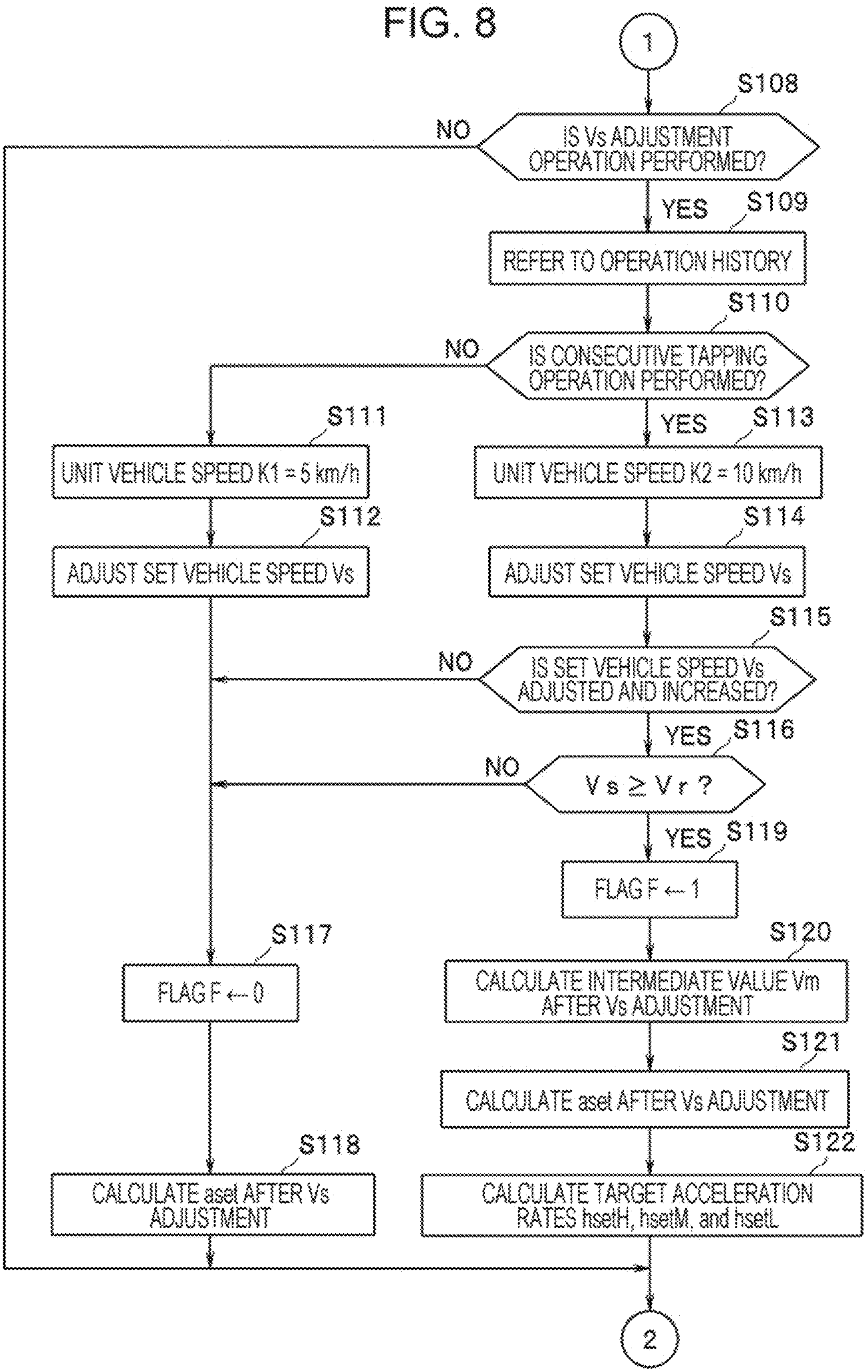
FIG. 8 is a second flowchart illustrating the target-acceleration-rate setting routine.

Subsequently, in step S108, the travel control unit 5 determines whether an adjustment operation for the set vehicle speed Vs is performed, as illustrated in FIG. 8.

If the travel control unit 5 determines that the adjustment operation for the set vehicle speed Vs is not performed in step S108 (NO in step S108), the travel control unit 5 proceeds to step S123 to be described later.

In contrast, if the travel control unit 5 determines that the adjustment operation for the set vehicle speed Vs has been performed in step S108 (YES in step S108), the travel control unit 5 proceeds to step S109.

In step S109, the travel control unit 5 refers to an operation history.

Subsequently, in step S110, the travel control unit 5 determines whether the adjustment operation for the set vehicle speed Vs is a consecutive tapping operation based on the operation history. In detail, the travel control unit 5 determines whether the resume switch 15*c* or the set switch 15*b* is tapped consecutively at a time interval shorter than the predetermined set interval S (e.g., 500 ms).

If the travel control unit 5 determines that the adjustment operation for the set vehicle speed Vs is not a consecutive tapping operation in step S110 (NO in step S110), the travel control unit 5 proceeds to step S111.

In step S111, the travel control unit 5 selects the unit vehicle speed K1 (e.g., 5 km/h).

Then, in step S112, the travel control unit 5 adjusts the set vehicle speed Vs with the unit vehicle speed K1 based on the tapping operation, and proceeds to step S117 to be described later.

In contrast, if the travel control unit 5 determines that the adjustment operation for the set vehicle speed Vs is a consecutive tapping operation in step S110 (YES in step S110), the travel control unit 5 proceeds to step S113.

In step S113, the travel control unit 5 selects the unit vehicle speed K2 (e.g., 10 km/h).

Subsequently, in step S114, the travel control unit 5 adjusts the set vehicle speed Vs with the unit vehicle speed K2 based on the consecutive tapping operation, and proceeds to step S115.

In step S115, the travel control unit 5 determines whether the set vehicle speed Vs is adjusted and increased.

If the travel control unit 5 determines that the set vehicle speed Vs is not adjusted and increased in step S115 (NO in step S115), the travel control unit 5 proceeds to step S117 to be described later.

In contrast, if the travel control unit 5 determines that the set vehicle speed Vs is adjusted and increased in step S115 (YES in step S115), the travel control unit 5 proceeds to step S116.

In step S116, the travel control unit 5 determines whether the increase adjustment of the set vehicle speed Vs is an adjustment to a speed above or equal to the speed limit Vr (Vs Vr).

If the travel control unit 5 determines that the increase adjustment of the set vehicle speed Vs is an adjustment within a range below the speed limit Vr in step S116 (NO in step S116), the travel control unit 5 proceeds to step S117.

When the travel control unit 5 proceeds from step S112, step S115, or step S116 to step S117, the travel control unit 5 sets a high-acceleration-mode flag F to 0, and subsequently proceeds to step S118. The high-acceleration-mode flag F is a flag set for determining whether a transition can be made to the high acceleration mode. For example, when it is determined that a transition can be made to the high acceleration mode, the travel control unit 5 sets the high-acceleration-mode flag F to 1. In contrast, when it is determined that a transition cannot be made to the high acceleration mode, the travel control unit 5 sets the high-acceleration-mode flag F to 0. Accordingly, the travel control unit 5 can determine whether a transition can be made to the high acceleration mode in accordance with the high-acceleration-mode flag F.

In step S118, the travel control unit 5 calculates the target acceleration rate aset after the adjustment of the set vehicle speed Vs based on the basic acceleration characteristic A, and subsequently proceeds to step S123 to be described later.

In contrast, if the travel control unit 5 determines that the set vehicle speed Vs is above or equal to the speed limit Vr in step S116 (YES in step S116), the travel control unit 5 proceeds to step S119.

In step S119, the travel control unit 5 sets the high-acceleration-mode flag F to 1, and subsequently proceeds to step S120.

In step S120, the travel control unit 5 calculates the intermediate value Vm (=(Vr+V)/2) between the vehicle speed V and the speed limit Vr.

Subsequently, in step S121, the travel control unit 5 calculates the target acceleration rate aset after the adjustment of the set vehicle speed Vs based on the basic acceleration characteristic A.

Then, in step S122, the travel control unit 5 calculates the target acceleration rate hsetH, the target acceleration rate hsetM, and the target acceleration rate hsetL based on the acceleration gain map (see FIG. 6) of the high acceleration characteristic B.

In detail, the travel control unit 5 calculates the acceleration gains G (acceleration gains GH, GM, and GL) according to the vehicle-speed difference Vrdif based on the acceleration gain map. By multiplying each of the calculated acceleration gains GH, GM, and GL by the target acceleration rate aset, the travel control unit 5 calculates the target acceleration rates hsetH, hsetM, and hsetL. The acceleration gain map preliminarily includes a high acceleration rate H, an intermediate acceleration rate M, and a low acceleration rate L that have different characteristics. The high acceleration rate H, the intermediate acceleration rate M, and the low acceleration rate L are preliminarily obtained from, for example, tests and simulation as characteristics for accurately generating a higher acceleration rate than the basic acceleration characteristic A. The travel control unit 5 then calculates the target acceleration rates hsetH, hsetM, and hsetL, and subsequently proceeds to step S123.

Figure 9:
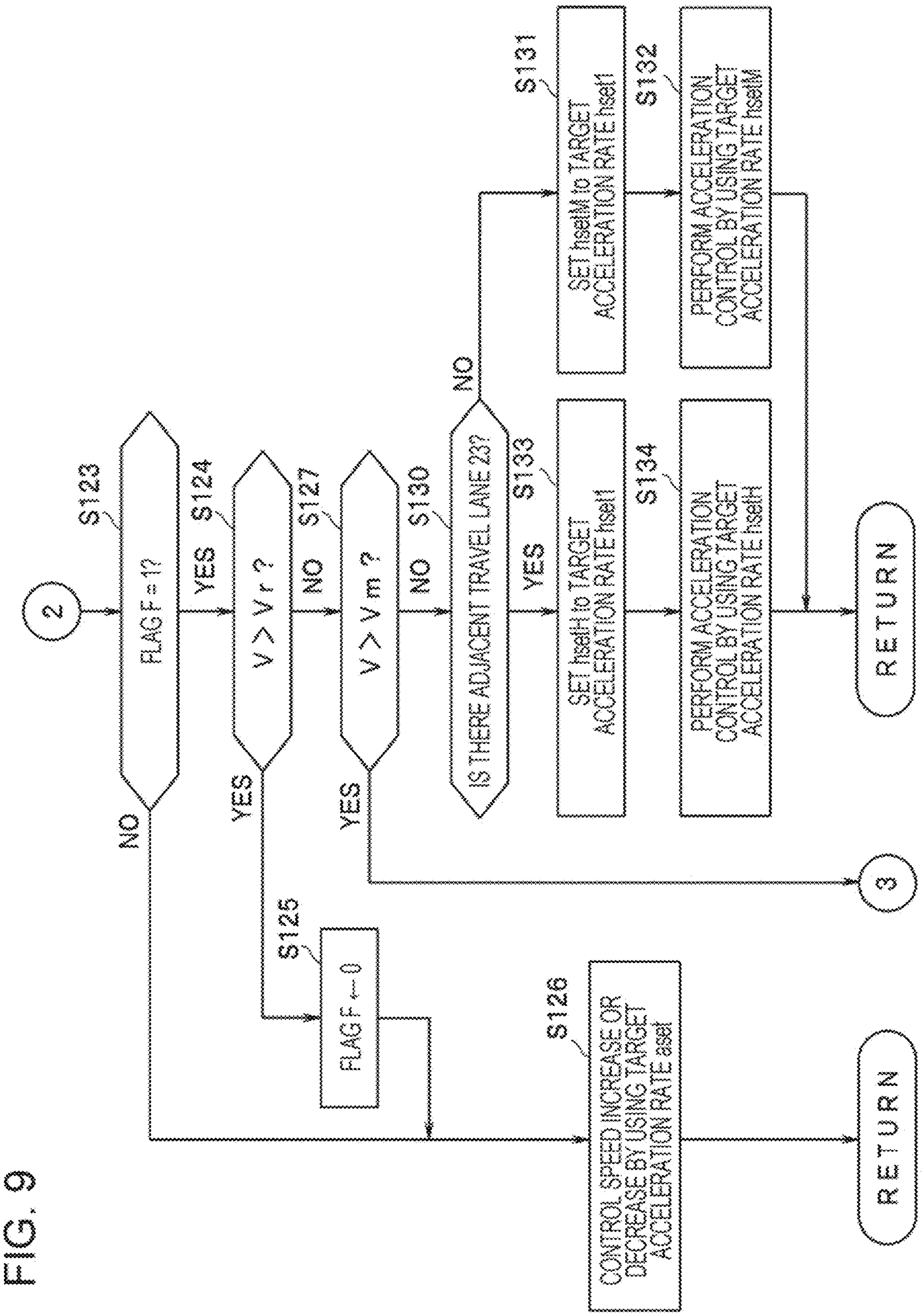
FIG. 9 is a third flowchart illustrating the target-acceleration-rate setting routine.

When the travel control unit 5 proceeds from step S108, step S118, or step S122 to step S123, the travel control unit 5 determines whether the high-acceleration-mode flag F is set to 1, as illustrated in FIG. 9.

If the travel control unit 5 determines that the high-acceleration-mode flag F is not set to 1 in step S123 (NO in step S123), the travel control unit 5 proceeds to step S126 to be described later.

In contrast, if the travel control unit 5 determines that the high-acceleration-mode flag F is set to 1 in step S123 (YES in step S123), the travel control unit 5 proceeds to step S124.

In step S124, the travel control unit 5 determines whether the vehicle speed V is above the speed limit Vr.

If the travel control unit 5 determines that the vehicle speed V is above the speed limit Vr in step S124 (YES in step S124), the travel control unit 5 proceeds to step S125.

In step S125, the travel control unit 5 changes the high-acceleration-mode flag F from 1 to 0. After setting the high-acceleration-mode flag F to 0, the travel control unit 5 proceeds to step S126.

When the travel control unit 5 proceeds from step S123 or step S125 to step S126, the travel control unit 5 controls an increase or decrease of the vehicle speed V as normal vehicle speed control by using the target acceleration rate aset, and subsequently exits the routine.

In contrast, if the travel control unit 5 determines that the vehicle speed V is below or equal to the speed limit Vr in step S124 (NO in step S124), the travel control unit 5 proceeds to step S127.

In step S127, the travel control unit 5 determines whether the vehicle speed V is above the intermediate value Vm.

If the travel control unit 5 determines that the vehicle speed V is above the intermediate value Vm in step S127 (YES in step S127), the travel control unit 5 proceeds to step S128.

Figure 10:
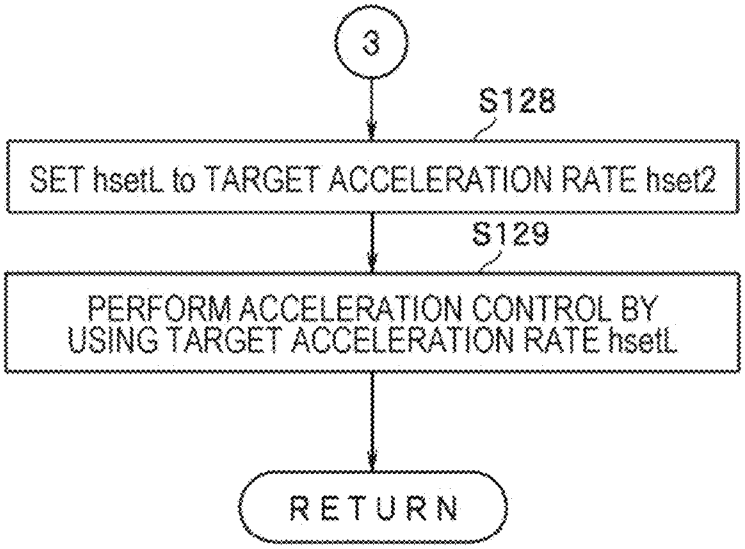
FIG. 10 is a fourth flowchart illustrating the target-acceleration-rate setting routine.

In step S128, the travel control unit 5 sets the target acceleration rate hsetL to the target acceleration rate hset2, as illustrated in FIG. 10.

Subsequently, in step S129, the travel control unit 5 controls an increase of the vehicle speed V by using the target acceleration rate hsetL as the target acceleration rate hset2, and subsequently exits the routine.

In contrast, if the travel control unit 5 determines that the vehicle speed V is below or equal to the intermediate value Vm in step S127 (NO in step S127), the travel control unit 5 proceeds to step S130.

In step S130, the travel control unit 5 determines whether the adjacent travel lane 23 exists.

If the travel control unit 5 determines that there is no adjacent travel lane 23 in step S130 (NO in step S130), the travel control unit 5 proceeds to step S131.

In step S131, the travel control unit 5 sets the target acceleration rate hsetM to the target acceleration rate hset1, and subsequently proceeds to step S132.

In step S132, the travel control unit 5 controls an increase of the vehicle speed V by using the target acceleration rate hsetM, and subsequently exits the routine.

In contrast, if the travel control unit 5 determines that the adjacent travel lane 23 exists in step S130 (YES in step S130), the travel control unit 5 proceeds to step S133.

In step S133, the travel control unit 5 sets the target acceleration rate hsetH to the target acceleration rate hset1, and subsequently proceeds to step S134.

When the travel control unit 5 proceeds to step S134, the travel control unit 5 controls an increase of the vehicle speed V by using the target acceleration rate hsetH, and subsequently exits the routine.

According to this embodiment, the vehicle drive assist apparatus 2 includes the stereo image recognizer 4, vehicle-speed adjustment switches (15*b* and 15*c*), and the travel control unit 5. The stereo image recognizer 4 recognizes external environment information including the vehicle travel lane 22. The vehicle-speed adjustment switches (15*b* and 15*c*) are used for performing an adjustment for increasing or decreasing the set vehicle speed Vs for performing the constant-speed travel control. The travel control unit 5 increases or decreases the set vehicle speed Vs by the unit vehicle speed K1 every time either of the vehicle-speed adjustment switches (15*b* or 15*c*) is tapped, calculates the target acceleration rate aset based on the preset basic acceleration characteristic A, and adjusts the vehicle speed V to the set vehicle speed Vs by using the calculated target acceleration rate aset. When the set vehicle speed Vs is adjusted so as to increase in response to a consecutive tapping operation performed on the vehicle-speed adjustment switch (15*b* or 15*c*) and the set vehicle speed Vs is above or equal to the speed limit Vr, the travel control unit 5 calculates the first target acceleration rate (hset) until the vehicle speed V reaches the speed limit Vr based on the high acceleration characteristic B for generating an acceleration rate higher than the basic acceleration characteristic A, and calculates the second target acceleration rate (aset) after the vehicle speed V reaches the speed limit Vr based on the basic acceleration characteristic A.

According to this configuration, the vehicle drive assist apparatus 2 can smoothly change the set vehicle speed Vs for quickly accelerating the vehicle 1 to the speed limit Vr while respecting the driver's intention and ensuring safety.

In one example, when the set vehicle speed Vs is adjusted to a speed above or equal to the speed limit Vr in response to the consecutive tapping operation to increase the set vehicle speed Vs, the travel control unit 5 recognizes that the driver has made an acceleration request at an acceleration rate higher than usual. When the travel control unit 5 recognizes such a request, the travel control unit 5 transitions to the high acceleration mode and calculates the first target acceleration rate (hset) until the vehicle 1 reaches the speed limit Vr based on the high acceleration characteristic B. Then, the travel control unit 5 causes the vehicle 1 to accelerate quickly to the speed limit Vr by using the first target acceleration rate (hset). Accordingly, the travel control unit 5 can achieve quick acceleration while respecting the driver's intention.

On the other hand, when the vehicle 1 reaches the speed limit Vr, the travel control unit 5 cancels the high acceleration mode and calculates the second target acceleration rate (aset) based on the basic acceleration characteristic A. In one example, after the speed limit Vr is reached, the travel control unit 5 performs acceleration to the set vehicle speed Vs by using the second target acceleration rate (aset) that is lower than the first target acceleration rate (hset). By allowing the driver to feel this change in the acceleration rate, the travel control unit 5 can notify the driver that the vehicle speed V has exceeded the speed limit Vr. Furthermore, by suppressing the acceleration rate after the vehicle speed V has exceeded the speed limit Vr, the travel control unit 5 can ensure safety.

In addition, when at least one adjacent travel lane 23 is recognized by the stereo image recognizer 4, the travel control unit 5 sets the first target acceleration rate (hset) to a relatively higher value than when the adjacent travel lane 23 is not recognized.

In detail, as illustrated in FIG. 5, when the adjacent travel lane 23 is recognized, the travel control unit 5 sets the target acceleration rate hsetH that serves as the target acceleration rate hset1 until the vehicle speed V reaches the intermediate value Vm and that is calculated based on the high acceleration characteristic B.

Accordingly, on a road having multiple lanes on each side where vehicles tend to travel at high speed as a whole, each vehicle can accelerate at a high acceleration rate that matches the driver's intention. By performing such acceleration, a favorable traffic flow can be achieved without imparting stress to, for example, a trailing vehicle. Furthermore, even when the driver desires to change lanes to an adjacent travel lane 23, acceleration can be achieved without giving a sense of discomfort to the driver.

As illustrated in FIG. 5, with regard to the first target acceleration rate (hset), the travel control unit 5 sets the target acceleration rate hset2, until the speed limit Vr is reached beyond the intermediate value Vm, to a value smaller than the target acceleration rate hset1.

Therefore, the travel control unit 5 can set the first target acceleration rate (hset) that accelerates the vehicle 1 to the speed limit Vr to a lower acceleration rate in a stepwise fashion. Accordingly, even when the target acceleration rate hset1 is set to a high value immediately after the start of the high acceleration mode, the vehicle drive assist apparatus 2 can suppress a sudden change in the acceleration rate after the speed limit Vr is reached.

When the travel control unit 5 recognizes a consecutive tapping operation at a time interval shorter than the set interval S, the travel control unit 5 changes the unit vehicle speed K1 (e.g., 5 km/h) to the unit vehicle speed K2 (e.g., 10 km/h) that is greater than the unit vehicle speed K1.

Therefore, when a consecutive tapping operation is recognized, the travel control unit 5 can change the set vehicle speed Vs requested by the driver in response to a smaller number of tapping operations. Accordingly, the vehicle drive assist apparatus 2 can achieve enhanced user friendliness when the set vehicle speed Vs is to be adjusted.

For example, even when a fuel-saving economical mode is set by the driver, if the travel control unit 5 according to this embodiment determines that a transition to the high acceleration mode is possible, the travel control unit 5 may temporarily transition to the high acceleration mode. Accordingly, temporary high acceleration according to the driver's intention can be achieved while improved fuel consumption can be ensured.

In order to further enhance safety, for example, the cruise-control display device 21 may be equipped with a function that changes the display color of the set-vehicle-speed indicator lamp 21*c* when the set vehicle speed Vs reaches the speed limit Vr during an increase adjustment of the set vehicle speed Vs. Alternatively, the cruise-control display device 21 may be equipped with a function that turns the set-vehicle-speed indicator lamp 21*c* into a blinking mode when the set vehicle speed Vs reaches the speed limit Vr.

In the above embodiment, for example, each of the stereo image recognizer 4, the travel control unit 5, the E/G_ECU 7, the BRK_ECU 8, and the T/M_ECU 9 is constituted of a known microcomputer equipped with a central processing unit (CPU), a random access memory (RAM), a read-only memory (ROM), and a nonvolatile storage unit, and peripheral devices thereof. The ROM preliminarily stores, for example, a program to be executed by the CPU, as well as fixed data, such as a data table. The functions of a processor may entirely or partially be constituted of either one of a logic circuit and an analog circuit, and the process of each of the various kinds of programs may be realized by an electronic circuit, such as a field programmable gate array (FPGA).

The above embodiment of the disclosure is not limited thereto and permits other various modifications so long as they do not depart from the scope of the disclosure in the practical phase. Furthermore, the above-described embodiment includes various stages of the embodiment of the disclosure, and various embodiments of the disclosure may be extracted by appropriately combining multiple elements to be disclosed.

If the aforementioned problem can be solved and the aforementioned advantages can be achieved even when some components are eliminated from all the components indicated in the above embodiment, the configuration without these eliminated components is extractable as an embodiment of the disclosure.

The vehicle drive assist apparatus according to the embodiment of the disclosure can smoothly change the set vehicle speed for quickly accelerating the vehicle to the speed limit while respecting the driver's intention and ensuring safety.

The invention claimed is:

1. A vehicle drive assist apparatus comprising:

an external environment recognizer comprising a camera and configured to recognize external environment information of a vehicle, the external environment information comprising information on a vehicle travel lane of the vehicle;

a vehicle-speed adjustment switch; and circuitry configured to:

determine, based on the external environment information, a speed limit of the vehicle travel lane;

perform constant-speed travel control for controlling a vehicle speed of the vehicle so that the vehicle speed coincides with a set vehicle speed; and during execution of the constant-speed travel control, increase the set vehicle speed by a unit vehicle speed every time a tapping operation is performed on the vehicle-speed adjustment switch, calculate a target acceleration rate based on a preset basic acceleration characteristic, and adjust the vehicle speed to the set vehicle speed by using the calculated target acceleration rate, wherein the circuitry is configured to, during execution of the constant-speed travel control:

determine whether the tapping operation has been performed consecutively;

determine whether the set vehicle speed is greater than or equal to the speed limit;

in response to (i) determining that the tapping operation has been performed consecutively and (ii) determining that the set vehicle speed is greater than or equal to the speed limit, calculate a first target acceleration rate based on a high acceleration characteristic and calculate a second target acceleration rate based on the preset basic acceleration characteristic, the first target acceleration rate being greater than the second target acceleration rate;

in response to calculation of the first target acceleration rate and the second target acceleration rate, increase the vehicle speed by using the first target acceleration rate until the vehicle speed reaches the speed limit, and, after the vehicle speed reaches the speed limit, increase the vehicle speed by using the second target acceleration rate; and in response to one or both of (i) determining that the tapping operation has not been performed consecutively and (ii) determining that the set vehicle speed is not greater than or equal to the speed limit, calculate the second target acceleration rate based on the preset basic acceleration characteristic, and adjust the vehicle speed to the set vehicle speed by using the second target acceleration rate.

2. The vehicle drive assist apparatus according to claim 1, wherein the circuitry is configured to, when an adjacent travel lane adjacent to the vehicle travel lane is recognized by the external environment recognizer, set the first target acceleration rate calculated based on the high acceleration characteristic to a relatively higher value than when the adjacent travel lane is not recognized.

3. The vehicle drive assist apparatus according to claim 2, wherein the first target acceleration rate is set such that an acceleration rate until the speed limit is reached beyond an intermediate value between the vehicle speed and the speed limit is lower than an acceleration rate until the vehicle speed reaches the intermediate value.

4. The vehicle drive assist apparatus according to claim 1, wherein the first target acceleration rate is set such that an acceleration rate until the speed limit is reached beyond an intermediate value between the vehicle speed and the speed limit is lower than an acceleration rate until the vehicle speed reaches the intermediate value.

5. The vehicle drive assist apparatus according to claim 1, wherein the circuitry is configured to, when the tapping operation is performed consecutively on the vehicle-speed adjustment switch at a time interval shorter than a set interval, set the unit vehicle speed to a value greater than the unit vehicle speed used when the tapping operation is performed at a time interval longer than or equal to the set interval.

6. The vehicle drive assist apparatus according to claim 1, wherein the circuitry is further configured to calculate the first target acceleration rate by multiplying the target acceleration rate calculated based on the preset basic acceleration characteristic by an acceleration gain that is greater than one, the acceleration gain being determined based on a vehicle-speed difference between the speed limit and the vehicle speed.

7. The vehicle drive assist apparatus according to claim 1, wherein the circuitry is further configured to, during execution of the constant-speed travel control, determine, based on the external environment information, whether a leading vehicle is present in the vehicle travel lane;

in response to determining that the leading vehicle is present in the vehicle travel lane, refrain from performing one or both of (i) a determination as to whether the tapping operation has been performed consecutively and (ii) a determination as to whether the set vehicle speed is greater than or equal to the speed limit; and in response to determining that the leading vehicle is not present in the vehicle travel lane, perform (i) the determination as to whether the tapping operation has been performed consecutively and (ii) the determination as to whether the set vehicle speed is greater than or equal to the speed limit.

8. The vehicle drive assist apparatus according to claim 1, further comprising a display-device configured to display the set vehicle speed and configured to change a display state of a set-vehicle-speed indicator when the set vehicle speed reaches the speed limit during an increase adjustment of the set vehicle speed.

9. A vehicle drive assist apparatus comprising:

an external-environment recognition module comprising a camera and configured to recognize external environment information of a vehicle, the external environment information comprising information on a vehicle travel lane of the vehicle;

a set-vehicle-speed adjustment switch; and a processor configured to:

determine, based on the external environment information, a speed limit of the vehicle travel lane;

perform constant-speed travel control for controlling a vehicle speed of the vehicle so that the vehicle speed coincides with a set vehicle speed; and during execution of the constant-speed travel control, increase the set vehicle speed by a unit vehicle speed every time a tapping operation is performed, calculate a target acceleration rate based on a preset basic acceleration characteristic, and adjust the vehicle speed to the set vehicle speed by using the calculated target acceleration rate, wherein the processor is configured to, during execution of the constant-speed travel control:

determine whether the tapping operation has been performed consecutively;

determine whether the set vehicle speed is greater than or equal to the speed limit;

in response to (i) determining that the tapping operation has been performed consecutively and (ii) determining that the set vehicle speed is greater than or equal to the speed limit, calculate a first target acceleration rate based on a high acceleration characteristic and calculate a second target acceleration rate based on the preset basic acceleration characteristic, the first target acceleration rate being greater than the second target acceleration rate;

in response to calculation of the first target acceleration rate and the second target acceleration rate, increase the vehicle speed by using the first target acceleration rate until the vehicle speed reaches the speed limit, and, after the vehicle speed reaches the speed limit, increase the vehicle speed by using the second target acceleration rate; and in response to one or both of (i) determining that the tapping operation has not been performed consecutively and (ii) determining that the set vehicle speed is not greater than or equal to the speed limit, calculate the second target acceleration rate based on the preset basic acceleration characteristic, and adjust the vehicle speed to the set vehicle speed by using the second target acceleration rate.

10. The vehicle drive assist apparatus according to claim 9, wherein the processor is further configured to calculate the first target acceleration rate by multiplying the target acceleration rate calculated based on the preset basic acceleration characteristic by an acceleration gain that is greater than one, the acceleration gain being determined based on a vehicle-speed difference between the speed limit and the vehicle speed.

11. The vehicle drive assist apparatus according to claim 9, wherein the circuitry is further configured to, during execution of the constant-speed travel control, determine, based on the external environment information, whether a leading vehicle is present in the vehicle travel lane;

in response to determining that the leading vehicle is present in the vehicle travel lane, refrain from performing one or both of (i) a determination as to whether the tapping operation has been performed consecutively and (ii) a determination as to whether the set vehicle speed is greater than or equal to the speed limit; and in response to determining that the leading vehicle is not present in the vehicle travel lane, perform (i) the determination as to whether the tapping operation has been performed consecutively and (ii) the determination as to whether the set vehicle speed is greater than or equal to the speed limit.

12. The vehicle drive assist apparatus according to claim 9, further comprising a display configured to display the set vehicle speed, wherein the display is configured to change a display state of a set-vehicle-speed indicator when the set vehicle speed reaches the speed limit during an increase adjustment of the set vehicle speed.

* * * * *